(No Model.)

G. T. PARKER.
DETACHING HORSES.

No. 366,978. Patented July 19, 1887.

Witnesses
H. A. Lamb.
Geo. W. Campbell.

Inventor
George T. Parker
By his Attorney Chas. J. Gooch

UNITED STATES PATENT OFFICE.

GEORGE T. PARKER, OF SMITH'S GROVE, KENTUCKY.

DETACHING HORSES.

SPECIFICATION forming part of Letters Patent No. 366,978, dated July 19, 1887.

Application filed January 20, 1887. Serial No. 224,900. (No model.)

*To all whom it may concern:*

Be it known that I, GEORGE T. PARKER, a citizen of the United States, residing at Smith's Grove, in the county of Warren and State of Kentucky, have invented certain new and useful Improvements in Whiffletree-Hooks and Trace-Detachers; and I do hereby declare the following to be a full, clear, and exact description of the invention, such as will enable others skilled in the art to which it appertains to make and use the same.

This invention relates to improvements in whiffletree-hooks and trace-detaching devices. The whiffletree-tip is formed with a socket at its inner end to receive the tenoned end of the whiffletree, with a circumferential groove or mortise and a projecting trace-pin at its outer end, and with a longitudinally and transversely extending slot or mortise, and outwardly-extending flanges or wings to receive the trace-guard and trace-detaching device. The trace-guard is near its inner end pivoted between and to the wings on the tip, and is at its inner end engaged and held in normal position by a plate-spring secured at its inner end within the longitudinal mortise by a screw, which also serves to secure the tip and whiffletree together, its outer end extending at a right-angle across and engaging with the outer end of the trace-pin and having an inwardly-extending toothed or serrated portion. The trace-detacher consists of a perforated plate or disk surrounding the trace-pin, and having an inwardly-extending toothed or serrated portion with which the teeth on the trace-guard engages, in order that as said guard is drawn back away from the trace-pin the teeth on said guard will engage the toothed portion of the trace-detacher and force said detacher outwardly and push the trace off the trace-pin.

Figure 1:
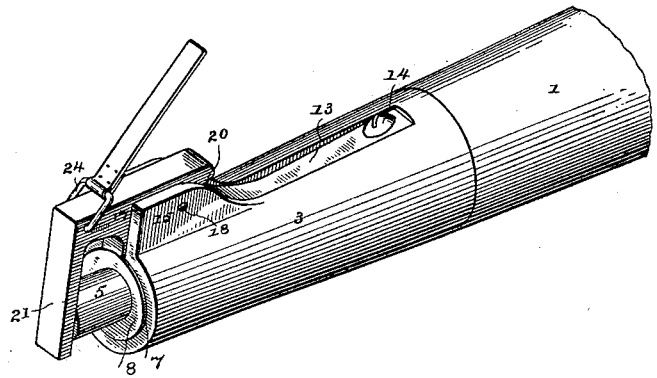
Figure 2:
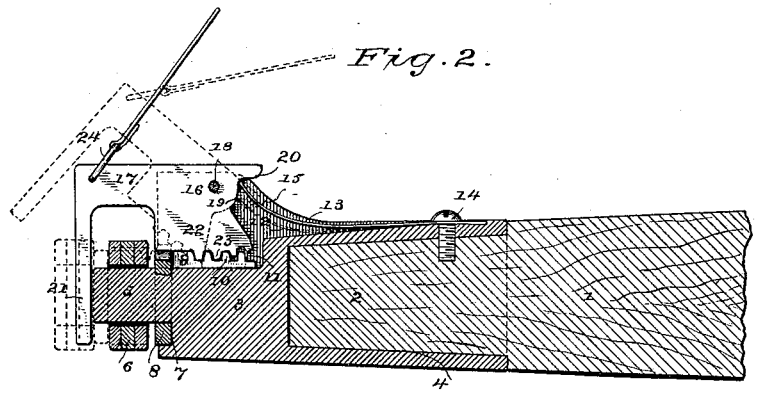

In the accompanying drawings, Figure 1 represents a perspective view of a portion of a whiffletree provided with my improvement. Fig. 2 represents a longitudinal vertical section thereof.

1 represents a whiffletree having a tenoned end, 2.

3 represents my improved whiffletree-tip having a socket, 4, formed at its inner end to receive the tenoned end of the whiffletree. The extreme outer end of the tip 3 is provided with a trace-pin, 5, with which the trace 6 engages in the customary manner, and with a circumferential groove or mortise, 7, within which the perforated trace-detaching plate or disk 8 rests when in its normal position of rest. This trace-detaching disk or plate 8 is provided with a rearward extension, 9, having on its outer face a series of cogs, teeth, or serrations, 10, said toothed extension resting and reciprocating within a rearwardly and transversely extending mortise, 11, in the outer end of the tip 3.

12 represents a rearwardly-extending mortise formed in the outer face of the tip to receive a plate spring, 13, whose inner end is secured within said mortise by a screw, 14, which also serves to connect the whiffletree-tip 3 and the whiffletree 1 together, said screw 14 being the sole means, according to my invention, by which said whiffletree and whiffletree tip are secured together.

15 represents transversely-extending wings, one on each side of the mortise 12, located at the outer end of the tip, and within which the inner portion, 16, of the trace guard 17 is contained, and to which it is pivoted, as shown at 18.

19 represents the curved inner end, and 20 an inwardly-extending lug or finger on the outer edge of the inner portion, 16, of the trace-guard. The free end of the plate spring 13 impinges against the inner face of this lug or finger 20, so as, when in normal position, to force the inner end of the guard outward, and consequently hold the right-angled outer end, 21, of said guard in engagement with the trace-pin.

22 represents a transverse extension or enlargement of the trace-guard, the inner edge of which is of curved form, as shown, and is provided with a series of teeth or serrations, 23, which engage with the teeth 10 on the trace-detacher.

24 represents a loop or ring secured to said trace-guard, and to which a cord, chain, or strap is attached, by means of which the occupant of the vehicle to which the device is attached may actuate the guard to throw the trace out of engagement with the trace-pin. When it is desired to release the traces from the whiffletree, by pulling rearwardly upon the cord or equivalent device attached to the loop or ring 24 the trace-guards 17 will be rocked rearwardly on their pivots 18, and the right-angled outer ends, 21, of said trace-guards will thereby be released from engagement with the trace-pins 5. As the outer ends of said guards 17 move back their inner ends are forced inward and upward and the curved toothed extension or enlargement 22 23 in engagement with the toothed inner ends, 9, of the trace-detachers 8 forces said detachers outward and causes the disks or plates thereof to push the traces off the trace-pins 5. Upon the traces being thus released the pull upon the cords or their equivalent is released, whereupon the tension upon the springs is also released, and the said springs will then force the trace-guards back to their normal position, and as said trace-guards resume their normal position they will retract the trace-detaching devices within the tips 3.

Having thus described my invention, what I claim is—

1. In combination with a whiffletree-tip having an external longitudinal mortise, side wings, and a trace-pin, a trace-guard pivoted to said wings and having a right-angled outer end extending across and resting upon the outer end of the trace-pin and adapted at its inner end to receive the outer end of a plate-spring, a plate-spring secured at its inner end within said mortise and impinging at its outer end against said trace-guard, and suitable means for retracting the trace-guard.

2. A whiffletree-tip having an outwardly-extending trace-pin, a longitudinal mortise and side wings, a trace-guard pivoted to said wings and adapted to impinge upon the outer end of the trace-pin and having a toothed or serrated inner face, a plate-spring secured at one end within said mortise and engaging at its other end with the trace-guard, and a trace-detaching device having a toothed or serrated outer portion, with which the toothed or serrated portion of the trace-guard engages so as to secure the reciprocation of said trace-detacher as the guard swings back and forth, substantially as set forth.

3. The combination of a longitudinally-reciprocating trace-detacher, having a toothed or serrated inner portion, a trace-guard having a toothed or serrated portion to engage with and reciprocate the trace-detacher, and devices, substantially as described, for holding in position and for retracting said trace-guard and reciprocating the trace-detacher.

4. The combination of a whiffletree having a tenoned end, a whiffletree-tip having a socket in its inner end to receive said tenon, a longitudinal mortise in its exterior face, and side wings, a trace-guard pivoted to said wings, a plate-spring within said mortise, its outer end being in engagement with said trace-guard, and a screw for securing the inner end of said spring within said mortise and also connecting the whiffletree and whiffletree-tip together, substantially as set forth.

5. The combination of a whiffletree-tip having a trace-pin, a circumferential groove or mortise surrounding said pin, a longitudinal mortise and side wings, a trace-guard pivoted to said wings and having a toothed or serrated inner face, a plate-spring secured within the longitudinal mortise to impinge against and hold the guard in operative postion, and a trace-detacher having a disk or plate surrounding the trace-pin and, when at rest, fitting within the circumferential mortise, and an inwardly-extending toothed portion engaging with the toothed portion of the trace-guard and by it reciprocated within the longitudinal mortise, substantially as set forth.

In testimony whereof I affix my signature in presence of two witnesses.

GEORGE T. PARKER.

Witnesses:
WM. HAZELIP,
G. S. CURD.